(12) United States Patent
Truesdale et al.

(10) Patent No.: US 7,726,195 B2
(45) Date of Patent: Jun. 1, 2010

(54) ACCELERATOR/BRAKE CONTROL USING ACOUSTIC SENSING

(75) Inventors: Brian Truesdale, Glenview, IL (US); Donald L. Sweeney, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 42 days.

(21) Appl. No.: 12/065,743

(22) PCT Filed: Nov. 13, 2006

(86) PCT No.: PCT/US2006/043955
§ 371 (c)(1),
(2), (4) Date: Mar. 5, 2008

(87) PCT Pub. No.: WO2007/056598
PCT Pub. Date: May 18, 2007

(65) Prior Publication Data
US 2008/0250861 A1 Oct. 16, 2008

Related U.S. Application Data

(60) Provisional application No. 60/736,212, filed on Nov. 14, 2005.

(51) Int. Cl.
*G01L 11/00* (2006.01)

(52) U.S. Cl. .......................................... 73/702; 73/649
(58) Field of Classification Search .................... 73/702
See application file for complete search history.

(56) References Cited

U.S. PATENT DOCUMENTS

| 5,243,148 A | 9/1993 | Knowles |
| 5,986,224 A | 11/1999 | Kent |
| 6,933,932 B2 | 8/2005 | Knowles |
| 7,106,310 B2 | 9/2006 | Knowles |
| 2005/0247289 A1 * | 11/2005 | Visser et al. ........... 123/406.47 |

OTHER PUBLICATIONS

ISR for PCT/US06/43955 mailed Feb. 26, 2007.

* cited by examiner

*Primary Examiner*—Andre J Allen
(74) *Attorney, Agent, or Firm*—Lowe Hauptman Ham & Berner LLP

(57) ABSTRACT

A pressure sensitive acoustic wave sensor and actuator include an acoustic wave cavity formed in a substrate, a transducer generating an acoustic wave substantially trapped in the acoustic wave cavity and an acoustic wave absorbing member that absorbs more acoustic wave energy in the acoustic wave cavity in response to increased pressure on the member. The speed and/or braking of an electric vehicle is controlled through operator input of a foot pedal, using the pressure sensitive acoustic wave sensor.

21 Claims, 2 Drawing Sheets

ACCELERATOR/BRAKE CONTROL USING ACOUSTIC SENSING

CROSS-REFERENCE TO RELATED APPLICATIONS

The present regular United States patent application claims the benefits of U.S. Provisional Application Ser. No. 60/736,212, filed on Nov. 14, 2005.

FIELD OF THE INVENTION

The present invention relates generally to pressure sensors and pressure sensitive actuator mechanisms such as accelerator and/or brake assemblies on electric vehicles having electric drive systems and more particular to a sensor and actuator that utilizes a pressure sensitive acoustic wave sensor.

BACKGROUND OF THE INVENTION

Vehicles such as forklifts, utility carts, golf carts and other electric vehicles are known to use a variety of controls for operating, accelerating and/or braking functions of the electric drive system. For example, it is known to use various types of position sensors, both mechanical and optical, to determine the position of an accelerator pedal and to control acceleration accordingly. Electromechanical potentiometers use a resistive element that is swept by a contacting member. The contacting member moves with the foot pedal or other similar actuation system. As the contacting member moves across the resistive element, the voltage changes across the device, causing the output voltage of the device to vary with pedal position. Another known system uses a magnetic field to change the state of a solid state element. As the magnet moves past the device, the state of electronics within the device changes, indicating that the pedal or other actuator has moved. Known as "Hall Effect" devices, some read the change in the magnetic field and interpret the change like a potentiometer, varying the output voltage with the change in magnetic field polarity and amplitude.

Electromechanical systems have limited life due to mechanical wear. Since such devices depend on two surfaces contacting and wiping against one another, friction and debris can cause the materials to wear and the potentiometer to fail prematurely. Wear is accelerated if the components are not aligned properly. Misalignment of components can occur quickly and unexpectedly because of the sometimes rugged use to which the vehicles are exposed. Significant wear can occur before the misalignment is detected during routine inspections or maintenance.

Hall Effect devices and some optical systems have high manufacturing costs in addition to mechanical limitations. Hall Effect devices require microchips that are specially provided to work with the Hall Effect, and can add considerable cost to the device. Optical devices often require an encoder disk with precisely located and etched markings that can be read by optical elements. Often the disks are laser etched and expensive. The optical devices can be very sensitive to contaminants that change the optical properties of the disk. Sealing the device may be effective in avoiding contamination, but adds further cost to the assembly.

Acoustic wave sensors and switches are known in which a transducer is mounted on or adjacent to an acoustic wave cavity formed in a substrate to generate an acoustic wave that is a standing wave trapped in the acoustic wave cavity. These acoustic wave sensors or switches have been used to detect a touch on a surface of the substrate opposite from the surface on which the transducer is mounted by sensing changes in the standing wave.

There is a need for durable, yet accurate controls for electric vehicles that can be provided at reasonable expense.

SUMMARY OF THE INVENTION

In accordance with the present invention, the disadvantages of prior sensors as discussed above have been overcome. In accordance with the present invention, a pressure sensor and pressure sensitive actuator utilize acoustic wave energy that is substantially trapped in an acoustic wave cavity and a damper formed of an acoustic wave absorbing material wherein the damper is such that the greater the pressure applied to the damper, the greater the absorption of acoustic wave energy in the acoustic wave cavity due to an increase in the area of the surface of the acoustic wave cavity contacted by the damper.

More particularly, in accordance with one feature of the present invention, a pressure sensor includes a substrate having an acoustic wave cavity formed therein by an area of greater mass per unit surface area of the substrate than the mass per unit surface area of a portion of the substrate adjacent to and surrounding the acoustic wave cavity. A transducer is mounted on or adjacent to a first surface of the acoustic wave cavity for generating an acoustic wave in the acoustic wave cavity. An acoustic wave absorbing member, herein referred to as a damper, is mounted adjacent to a surface of the acoustic wave cavity, opposite the first surface of the cavity wherein the acoustic wave absorbing member or damper has a surface for contacting the acoustic wave cavity in response to the application of pressure on the acoustic wave absorbing member or damper. The acoustic wave absorbing member or damper is shaped such that the greater the pressure applied to the acoustic wave absorbing member or damper, the greater the area of the surface of the acoustic wave cavity contacted by the acoustic wave absorbing member or damper. The transducer is responsive to acoustic wave energy in the acoustic wave cavity to provide a signal representing the response of the acoustic wave in the cavity to variations in pressure applied to the acoustic wave absorbing member or damper.

In accordance with another feature of the invention, a pressure responsive foot pedal control is provided which includes a foot pedal having a user input surface and a second surface opposite of the user input surface either forming the damper or on which the acoustic wave absorbing member or damper of the acoustic wave pressure sensor is mounted. Pressure on the foot pedal applies pressure to the acoustic wave absorbing member or damper such that the signal provided by the transducer varies in response to pressure applied to the foot pedal.

In a still further aspect thereof, the present invention provides a method for controlling movement of an electric vehicle including providing an acoustic wave sensor in the vehicle; sensing a user input with the acoustic wave sensor to provide an acoustic wave sensor signal that varies with variations in said user input and changing a movement characteristic of the vehicle in response to variations in the acoustic wave sensor signal.

An advantage of the present invention is providing a pressure sensor and/or control mechanism which is rugged yet sensitive and accurate.

Another advantage of the present invention is providing a sensor and/or control mechanism for the accelerator and/or braking systems of electric vehicles which is rugged and less prone to failure than mechanical switches currently used.

Still another advantage of the present invention is providing a sensor and/or control mechanism for the accelerator and/or braking systems of electric vehicles that can be provided at reasonable expense.

Other features and advantages of the invention will become apparent to those skilled in the art upon review of the following detailed description, claims and drawings in which like numerals are used to designate like features.

Figure 1:
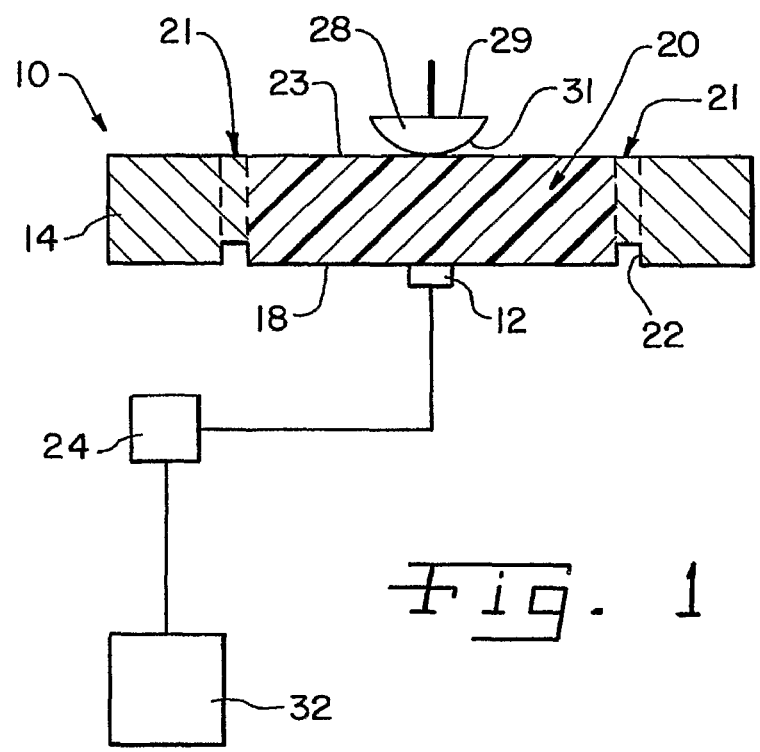
FIG. 1 is a schematic illustration of an acoustic wave pressure sensor in accordance with one embodiment of the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

An acoustic wave pressure sensor in accordance with the present invention, as shown in FIG. 1, includes a substrate 14 having an acoustic wave cavity 20 formed therein by an area of greater mass per unit surface area of the substrate than the mass per unit surface area of a portion 21 of the substrate adjacent to and surrounding the acoustic wave cavity 20. In one embodiment, the acoustic wave cavity is formed by milling a channel 22 in a surface of the substrate so that the inner edge of the channel defines an outer boundary of the acoustic wave cavity, the acoustic wave cavity extending through the thickness of the substrate from a first surface 18 to a second surface 23. In another embodiment, the acoustic wave cavity may be formed by a raised area on the substrate wherein the boundary of the acoustic wave cavity is defined by the periphery of the raised area. Examples of various ways to form an acoustic wave cavity are disclosed in U.S. Pat. No. 7,106,310 entitled ACOUSTIC WAVE TOUCH ACTUATED SWITCH, assigned to the assignee of the present invention and incorporated herein by reference.

The acoustic wave pressure sensor 10 includes a transducer such as a piezo-electric transducer 12 mounted on a surface 18 of the acoustic wave cavity 20 to generate an acoustic wave in the acoustic wave cavity 20. The acoustic wave that is generated in the acoustic wave cavity 20 is a standing wave that is substantially trapped in the acoustic wave cavity 20. In accordance with another embodiment of the present invention, the transducer may be an electromagnetic acoustic transducer positioned adjacent to a surface of the acoustic wave cavity 20 to generate the standing, acoustic wave in the acoustic wave cavity 20. Details of an electromagnetic acoustic transducer used to generate a resonant acoustic wave, i.e., a standing wave, that is substantially trapped in the acoustic wave cavity are shown in U.S. Pat. No. 6,933,932 entitled ACOUSTIC WAVE SENSOR WITH EMAT DRIVE assigned to the assignee of the present invention and incorporated herein by reference.

The acoustic wave pressure sensor 10 also includes an acoustic wave absorbing member 28, also referred to herein as a damper, which is formed of a material that will absorb acoustic wave energy in the acoustic wave cavity 20 upon contact with a surface, for example the surface 23, of the acoustic wave cavity 20. The acoustic wave absorbing member 28 is shaped such that the greater the pressure applied to the acoustic wave absorbing member on a surface 29 thereof, the greater the area of the surface 31 of the acoustic wave absorbing member contacting the acoustic wave cavity and in turn, the greater the area of the acoustic wave cavity contacted by the surface 31 of the acoustic wave absorbing member 28. The acoustic wave absorbing member 28 is preferably formed of an elastomeric material such as rubber, latex, Viton, etc. and is shaped such that the surface 31 of the member 28 is curved or round so that when pressure is applied to the back surface 29 of the acoustic wave absorbing member 28, the surface 31 flattens against the surface 23 of the acoustic wave cavity. As the surface 31 of the acoustic wave absorbing member 28 becomes increasingly flattened against the surface 23 of the acoustic wave cavity 20, the area of the acoustic wave cavity 20 contacted by the acoustic wave absorbing member 28 increases. As the area of the acoustic wave cavity 20 contacted by the acoustic wave absorbing member increases, the more acoustic wave energy that is absorbed by the member 28. The transducer 12 is responsive to the acoustic wave energy in the acoustic wave cavity to provide a signal representing the response of the acoustic wave energy in the acoustic wave cavity to variations in pressure applied to the acoustic wave absorbing member 28 such that the signal representing the acoustic wave energy in the cavity 20 decays more quickly to a predetermined level as greater pressure is applied to the acoustic wave absorbing member 28 increasing the area of the surface 23 of the acoustic wave cavity 20 contacted by the member 28.

The signal provided by the transducer 12 is coupled to a microprocessor based controller 24 which is responsive to the transducer signal representing the acoustic wave energy in the acoustic wave cavity to determine a value representing the period of time that it takes the acoustic wave to decay to a predetermined level. The more quickly the transducer signal decays to a predetermined level, the greater the pressure detected by the acoustic wave pressure sensor 10. It should be noted, that the relationship between the applied pressure and time of decay of the signal to a predetermined level is not necessarily a linear relationship but is determined by the specific material used to form the acoustic wave absorbing member 28. The microprocessor based controller 24 may use a look up table to determine the pressure applied to the acoustic wave absorbing member 28 based on the time of decay of the transducer signal to a predetermined level. Details of a suitable microprocessor based controller for detecting the period of time that the acoustic wave takes to decay to a predetermined level are disclosed in United States Patent Application Publication No. US 2004/0246239A1 published Dec. 9, 2004 based on patent application Ser. No. 10/454,003 filed Jun. 4, 2003, entitled ACOUSTIC WAVE TOUCH DETECTION CIRCUIT AND METHOD, assigned to the assignee of the present invention and incorporated herein by reference. The output of the microprocessor based controller 24 may be coupled to a system controller 32 for controlling a device in response to changes in pressure applied to the acoustic wave absorbing member 28 so as to provide a pressure sensitive actuator. An advantage of the acoustic wave pressure sensor system is that the system can be made as a so-called "smart system." For example, if the microprocessor sees the same decay time over numerous consecutive periods, that decay time can be used as a new base decay time indicative of no pressure being applied. Other adjustments can be made by the microprocessor to take advantage of system self-diagnosis that occurs when the system is "on" but operating under a no pressure or steady-state condition.

Figure 2:
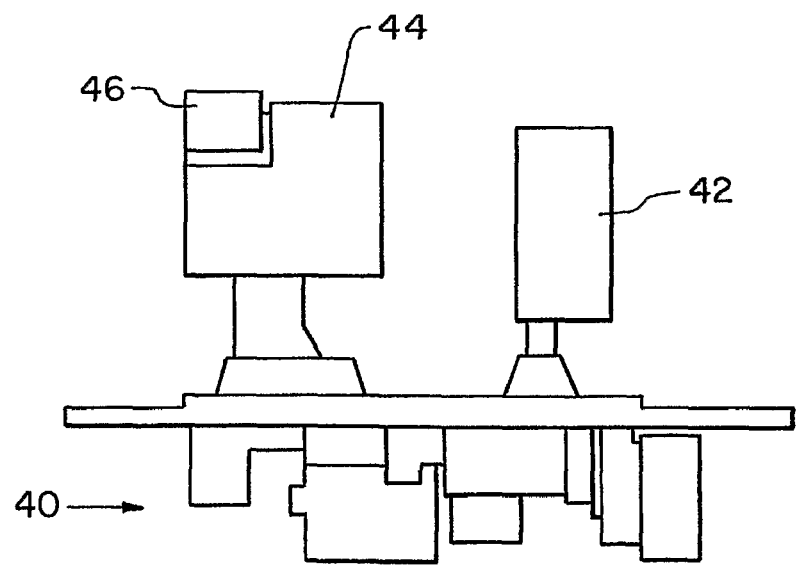
FIG. 2 is an illustration of an acoustic wave pressure sensing system operated by an accelerator pedal and a brake pedal of an electric vehicle.

In accordance with another feature of the present invention the acoustic wave pressure sensor can be used in a foot pedal for acceleration or braking. For example, an accelerator pedal or brake pedal may be mounted on the back surface 29 of the acoustic wave absorbing member, i.e., damper 28, so that increased pressure on the accelerator pedal can be detected by the acoustic wave pressure sensor 10 as shown in FIG. 2 for a vehicle speed control and sensing system 40 used in an electric vehicle. Sensing system 40 includes an accelerator pedal 42 and a brake pedal 44 which are depressed for accelerating the vehicle and braking the vehicle, respectively. For increased acceleration, accelerator pedal 42 is depressed further. For steady speed operation accelerator pedal 42 is maintained at a relatively stable position. For deceleration, foot pressure against accelerator pedal 42 is decreased. Brake pedal 44 is operated in a similar manner. More forceful and aggressive of braking is initiated by depressing brake pedal 44 further. A parking brake pedal 46 is used to maintain brake conditions to prevent coasting of the vehicle.

Figure 3:
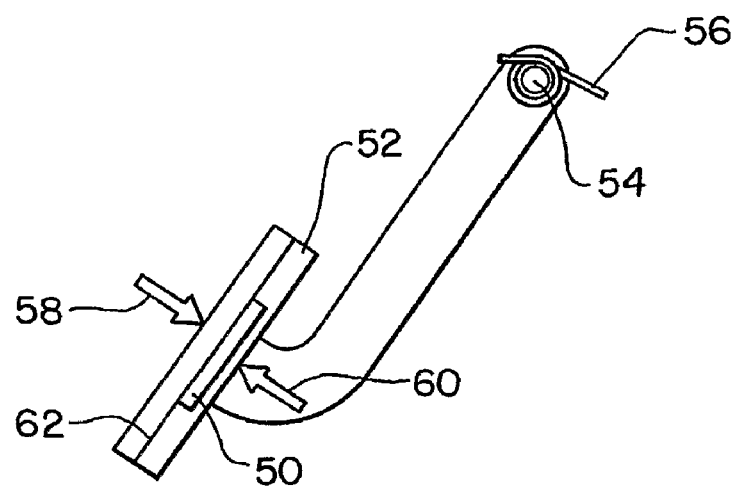
FIG. 3 is an elevational view of a foot pedal having an acoustic wave pressure sensing system in accordance with the present invention.

FIG. 3 illustrates a direct pressure embodiment for a foot pedal assembly of one embodiment of the present invention that can be used for accelerator pedal 42 or brake pedal 44 in system 40. An acoustic wave sensor 50 of the type described previously herein is incorporated in a foot pedal 52 that is pivotal about an axis 54. Foot pedal 52 is biased by a torsion spring 56. User applied force against pedal 52, indicated by arrow 58, counteracts spring force indicated by arrow 60. Sensor 50 is covered by a back surface 62 of the pedal 52 such that the surface 62 abuts the surface 29 of the damper 28 described with respect to FIG. 1. In another embodiment, the pedal 52 may form the damper 28 so that the damper 28 is exposed for direct user input by applied foot pressure.

When a force 58 is applied to the pedal 52 the acoustic wave sensor 50 can detect the force or pressure as discussed above. When an operator applies an increased force 58, an increased acoustic wave energy absorption occurs and the change is detected in sensor 50. Acoustic wave sensor 50 can detect a force greater than the force from spring 56, overcoming the spring force and causing foot pedal 52 to be moved. Signals from sensor 50, indicative of this condition, are transmitted to a speed controller 32 to command, for example, acceleration. After reaching a desired depressed position, force applied against pedal 52 is sufficient only to equal the force exerted by spring 56 so that pedal 52 is held at the desired position. Sensor 50 determines this condition and sends signals to the vehicles speed controller to maintain the existing speed. Finally, sensor 50 can further determine when force 58 applied against foot pedal 52 is less than the biasing force 60 from spring 56, thereby allowing spring 56 to move pedal 52 outwardly. Signals from sensor 50 indicative of this condition are used to initiate suitable output changes from the controller.

Figure 4:
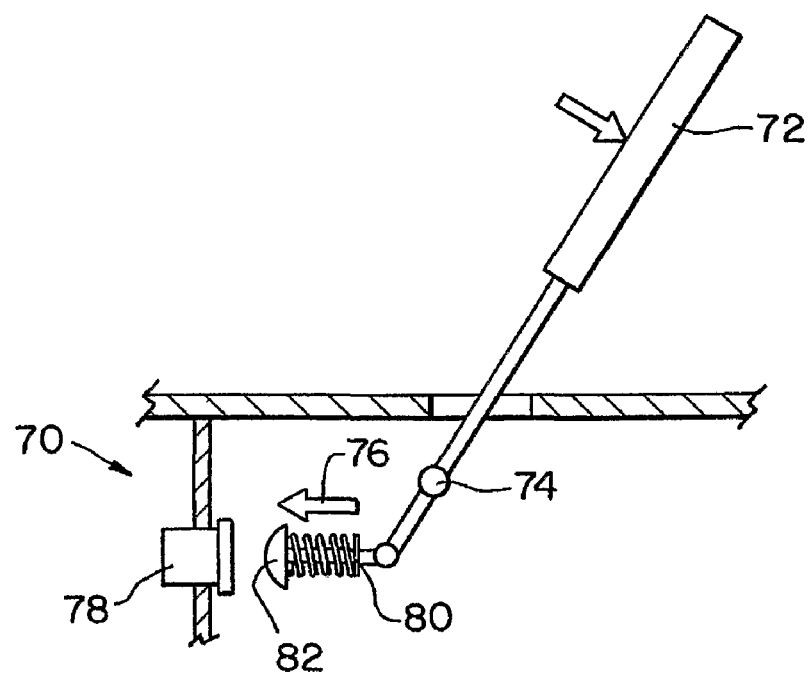
FIG. 4 is an elevational view of yet another embodiment of a pedal employing an acoustic wave pressure sensing system in accordance with the present invention.

FIG. 4 illustrates another embodiment of a pressure sensitive acoustic wave actuator system 70 that uses indirect application of user input force to affect acoustic wave energy absorption. A foot pedal 72 is pivotal about a pivot point 74. User input force designated by arrow 76 is provided against an exposed surface of foot pedal 72. An acoustic wave pressure sensor 78 of the type described is contacted by a spring loaded plunger 80 having a damper 82. Increased user input force 76 applies increased damping force by spring loaded plunger 80 against sensor 78. Changes in the pressure applied by plunger 80 cause changes in the amount of acoustic wave energy absorbed by the damper 82. Again the changes in acoustic wave energy can be detected to provide a signal to a controller to make operating changes in a manner similar to that described with respect to FIG. 3.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A pressure sensor comprising:
    a substrate having an acoustic wave cavity formed therein by an area of greater mass per unit surface area of the substrate than the mass per unit surface area of a portion of the substrate adjacent to and surrounding the acoustic wave cavity;
    a transducer mounted on or adjacent to a first surface of the acoustic wave cavity for generating an acoustic wave in the acoustic wave cavity; and
    an acoustic wave absorbing member mounted adjacent to a surface of the acoustic wave cavity opposite the first surface of the cavity and having a surface for contacting the acoustic wave cavity in response to the application of pressure on the acoustic wave absorbing member, the acoustic wave absorbing member being shaped such that the greater the pressure applied to the acoustic wave absorbing member, the greater the area of the surface of the acoustic wave absorbing member contacting the acoustic wave cavity, the transducer providing a signal representing the response of the acoustic wave in the cavity to variations in pressure applied to the acoustic wave absorbing member.

2. A pressure sensor as recited in claim 1 wherein the surface of the acoustic wave absorbing member for contacting the acoustic wave cavity is curved such that the curved surface is flattened against the acoustic wave cavity as pressure is applied to a surface of the acoustic wave absorbing member opposite the curved surface.

3. A pressure sensor as recited in claim 2 wherein the acoustic wave absorbing member is formed of an elastomeric material.

4. A pressure sensor as recited in claim 1 wherein the surface of the acoustic wave absorbing member for contacting the acoustic wave cavity is generally round such that the round surface is flattened against the acoustic wave cavity as pressure is applied to a surface of the acoustic wave absorbing opposite the round surface.

5. A pressure sensor as recited in claim 1 wherein the substrate includes a channel formed therein, the channel surrounding the acoustic wave cavity.

6. A pressure responsive foot pedal control comprising:
a substrate having an acoustic wave cavity formed therein by an area of greater mass per unit surface area of the substrate than the mass per unit surface area of a portion of the substrate adjacent to and surrounding the acoustic wave cavity;
a transducer mounted on or adjacent to a first surface of the acoustic wave cavity for generating an acoustic wave in the acoustic wave cavity;
a damper mounted adjacent a surface of the acoustic wave cavity opposite the first surface of the cavity and having a surface for contacting the acoustic wave cavity in response to the application of pressure on the damper, the damper being shaped such that the greater the pressure applied to the damper, the greater the area of the surface of the acoustic wave cavity contacted by the damper, the transducer providing a signal representing the response of the acoustic wave in the cavity to variations in pressure applied to the damper; and
a foot pedal having a user input surface and a second surface opposite the user input surface, and the damper is mounted on the second surface, wherein a pressure on the foot pedal is applied to the damper such that the signal provided by the transducer varies in response to the pressure applied to the foot pedal.

7. A pressure responsive foot pedal control as recited in claim 6 wherein the surface of the damper for contacting the acoustic wave cavity is curved such that the curved surface is flattened against the acoustic wave cavity as pressure is applied to a surface of the damper opposite the curved surface.

8. A pressure responsive foot pedal control as recited in claim 6 wherein the substrate includes a channel formed therein, the channel surrounding the acoustic wave cavity.

9. A pressure responsive foot pedal control as recited in claim 8 wherein the transducer is mounted on the same side of the substrate in which the channel is formed.

10. An electric drive control for a vehicle comprising:
a foot pedal assembly;
an acoustic wave sensor operatively connected to said foot pedal assembly for sensing a pressure applied to said foot pedal assembly; and
a controller receiving signals from said acoustic sensor for providing drive control signals in response to the pressure applied to said foot pedal assembly;
wherein said foot pedal assembly includes a foot pedal, and said acoustic sensor is disposed in said foot pedal.

11. An electric drive control for a vehicle as recited in claim 10, wherein said acoustic wave sensor includes an acoustic wave cavity and a substrate having a channel formed therein, the channel surrounding the acoustic wave cavity.

12. An electric drive control for a vehicle as recited in claim 11, wherein said acoustic wave sensor includes a transducer mounted on or adjacent to a surface of the acoustic wave cavity.

13. An electric vehicle drive control comprising:
a foot pedal assembly;
an acoustic wave sensor operatively connected to said foot pedal assembly for altered performance by operator movement of said foot pedal assembly, and the acoustic wave sensor further comprising:
an acoustic wave cavity;
a substrate having a channel formed therein, and the channel surrounding the acoustic wave cavity; and
a transducer mounted on or adjacent to a surface of the acoustic wave cavity; and
a controller receiving signals from said acoustic sensor for providing drive control signals in response to user input changes at said foot pedal assembly,
wherein said foot pedal assembly includes a foot pedal and a damper connected to said foot pedal to be moved by movement of said foot pedal, said damper contacting a surface of said acoustic wave cavity upon movement of said foot pedal such that the greater the movement of the foot pedal, the greater the area of the acoustic wave cavity contacted by the damper.

14. An electric vehicle drive control as recited in claim 13, wherein the transducer is mounted on a first side of said acoustic wave cavity and said damper is operable against a second side of said acoustic wave cavity opposite said first side.

15. An electric vehicle drive control as recited in claim 14, wherein said transducer provides a signal representing the response of the acoustic wave in the acoustic wave cavity to the contact of the damper with the acoustic wave cavity.

16. A method of controlling movement of an electric vehicle comprising:
providing an acoustic wave sensor in said vehicle;
sensing a user input with the acoustic wave sensor to provide an acoustic wave sensor signal that varies with variations in said user input; and
changing a movement characteristic of the vehicle in response to variations in the acoustic wave sensor signal.

17. A method of controlling movement of an electric vehicle as recited in claim 16, including operating a foot pedal to perform said user input of the acoustic sensor.

18. A method controlling movement of an electric vehicle as recited in claim 16, including detecting steady state performance of the acoustic wave sensor and adjusting responsiveness to said sensor signal based on detected changes in the steady state performance of the acoustic sensor.

19. A method controlling movement of an electric vehicle as recited in claim 16, wherein said changing includes altering a speed at which the vehicle is moved.

20. An electric drive control for a vehicle comprising:
a foot pedal assembly;
an acoustic wave sensor operatively connected to said foot pedal assembly for sensing a pressure applied to said foot pedal assembly; and
a controller receiving signals from said acoustic sensor for providing drive control signals in response to the pressure applied to said foot pedal assembly;
wherein said foot pedal assembly includes a foot pedal and a damper connected to said foot pedal to be moved by movement of said foot pedal, said damper contacting a surface of said acoustic wave cavity upon movement of said foot pedal such that the greater the movement of the foot pedal, the greater the area of the acoustic wave cavity contacted by the damper.

21. An electric drive control for a vehicle comprising:
a foot pedal assembly;
an acoustic wave sensor operatively connected to said foot pedal assembly for sensing a pressure applied to said foot pedal assembly; and
a controller receiving signals from said acoustic sensor for providing drive control signals in response to the pressure applied to said foot pedal assembly;
wherein said acoustic wave sensor physically interacts with said foot pedal assembly.

* * * * *